Patented Sept. 30, 1941

2,257,239

UNITED STATES PATENT OFFICE 2,257,239

PROCESS FOR IMPROVING FIBROUS MATERIALS

Hans Krzikalla and Richard Armbruster, Ludwigshafen-on-the-Rhine, Germany, assignors, by mesne assignments, to General Aniline & Film Corporation, New York, N. Y., a corporation of Delaware No Drawing. Application November 7, 1938, Serial No. 239,340. In Germany November 12, 1937

6 Claims. (Cl. 8—113)

The present invention relates to a new process for improving fibrous materials.

We have found that fibrous materials can be improved as regards their capacity of combining with dyestuffs and tanning agents by treating the dyed or tanned fibres or the fibres to be dyed or tanned with condensation products of nitrogenous compounds containing at least one hydrogen atom attached to nitrogen and capable of salt formation and aldehydes and other organic carbonyl compounds having activated methyl or methylene groups. Thus a good fixation of the dyestuffs or tanning agents on the fibres is obtained.

Suitable nitrogenous components of the said kind for the preparation of the said condensation products are for example ammonia, primary and secondary aliphatic amines, such as methylamine, dimethylamine, butylamine, dibutylamine, octodecylamine, octodecenylamine, abietinylamine, cyclohexylamine, ethylene diamine, and mono-, di- and tri-alkylolamines and aryl amines such as aniline and toluidine. Urea and allied compounds, as for example thiourea, guanidine, dicyanodiamide and the like may also be used.

As aldehydes there may be mentioned in particular the low molecular weight aliphatic aldehydes, such as formaldehyde and acetaldehyde. Substances may also be used which yield the aldehydes, as for example hexamethylene tetramine.

Among the other carbonyl compounds which are used for the preparation of the condensation products there may be mentioned acetone, methyl ethyl ketone and the higher homologues of this series, vinyl methyl ketone, acetophenone and its derivatives, cyclohexanone and methylcyclohexanone. Diketones, such as acetylacetone and other substituted carbonyl compounds having adjacent activated methyl or methylene groups which are not aldehydes, as for example ketoses, acetoacetic acid esters and cyanoacetic acid esters, may also be used.

In preparing the condensation products the necessary components may be mixed with each other and caused to react in any sequence, it being especially advantageous to work in such manner that the reaction mixture has an acid reaction at least towards the end of the reaction. This may be attained by using the nitrogenous components in the form of their salts with a strong acid. For example ammonium chloride may be used as an initial material. An acid or acid-reacting substance, as for example sodium bisulphate, may also be added.

The relative proportions in which the three components are used may be varied within wide limits. When ammonia or an ammonium salt serves as the nitrogenous component, it is advantageous to use at least two to three proportions of aldehyde, as for example formaldehyde. The third component may then be used in an equimolecular amount or in a smaller or larger amount. The reaction may be carried out in the presence of inert solvents. While in the case of very reactive initial materials the reaction commences without the supply of heat and in many cases may even have to be moderated by cooling, in other cases it is necessary to heat.

The water-soluble condensation products obtainable in the said manner can be used with advantage for fixing dyeings on the fibres of all kinds, as for example substantive dyeings on cotton or fibres of regenerated cellulose. The dyestuff is thereby combined considerably more firmly to the fibre, whereby its fastness to wetting is considerably improved. The improvement can be effected by first treating the fibre with the condensation product and then dying it or by after-treating the dyed fibre with the condensation product. As a rule very small amounts of the condensation products are sufficient to produce the desired action. It is advantageous to use such amounts that an excess of precipitant is present as compared with the acid groups of the dyestuff or tanning agent.

If leather which has been tanned with natural or synthetic tanning agents or hides which are to be tanned with the said tanning agents be treated with the said condensation products, the tanning agent is well fixed in the leather and is no longer removed therefrom by washing out. At the same time, the said treatment improves the weight and the plumpness of the leather. The said condensation products also have an excellent action in cases when using sulphite cellulose waste liquor tanning agents.

The following examples will further illustrate the nature of this invention but the invention is not restricted to these examples. The parts are by weight.

*Example 1*

A cotton fabric dyed with 3 per cent of Benzo fast scarlet 4BS (Schultz, Farbstofftabellen, 1931, No. 306) is treated for half an hour at room temperature with an aqueous solution containing per litre 4 grams of a product obtained by the condensation of 53 parts of ammonium chloride, 240 parts of formaldehyde (40 per cent) and 58 parts of acetone by heating to 70° C. and drying in vacuo at 70° C. The dyeing is considerably more fast to water than before the treatment.

Instead of the said condensation product analogous products from other ammonium salts than ammonium chloride, for example from ammonium sulphate, formaldehyde and acetone, may be employed with practically the same effect.

A similar improvement in the fastness to water is also obtained by using, instead of the said condensation products, a product obtainable by the condensation of 20 parts of aniline hydrochloride, 25 parts of 40 per cent formaldehyde and 10 parts of cyclohexanone by heating to 50° C. Dyeings on cotton, and also dyeings on viscose artificial silk or copper artificial silk which are obtained with Oxamine violet, Dianil blue R, Diamine fast red F or Benzo purpurin 10B (ibid, Nos. 397, 399, 410 and 489) may also be improved in the said manner.

Example 2

Cotton fabric dyed with 6 per cent of direct deep black E extra (ibid, No. 671) is theated for half an hour at room temperature with an aqueous solution containing per litre 4 grams of a product obtained by condensation of 50 parts of ammonium chloride (or equivalent amounts of other ammonium salts such as ammonium sulphate), 240 parts of formaldehyde and 100 parts of cyclohexanone by heating to boiling.

Instead of the said condensation products, there may also be used a condensation product obtainable by the condensation of 80 parts of dicyanodiamide with 250 parts of formaldehyde and 112 parts of cyclohexanone in hydrochloric acid solution.

With all of the said condensation products, a considerable improvement in the fastness to moisture is obtained.

Example 3

A neat's leather obtained by full tanning in the usual manner is drummed with from 40 to 60 per cent of water and 2 per cent of the condensation product from ammonium chloride, formaldehyde and acetone described in Example 1 (calculated with reference to dry leather) until the solution has been practically completely absorbed by the leather, for which purpose about half an hour is necessary. The tanning agent is then fixed and can no longer be washed out.

Instead of the said condensation product, other condensation products of the kind herein described may be used with similar results.

What we claim is:

1. A process for improving the reactivity of a fibrous material which comprises treating the said fibrous material with a water-soluble condensation product from an ammonium salt, formaldehyde and acetone.

2. A process for improving the reactivity of a fibrous material, which comprises treating the said fibrous material with a water-soluble condensation product from an ammonium salt, formaldehyde and cyclohexanone.

3. A process for improving the reactivity of a fibrous material, which comprises treating the said fibrous material with a water-soluble condensation product from ammonium chloride, formaldehyde and acetone.

4. A process for improving the reactivity of a fibrous material, which comprises treating the said fibrous material with a water-soluble condensation product from ammonium chloride, formaldehyde and cyclohexanone.

5. A process for improving the reactivity of fibrous material which comprises treating fibrous material with a water-soluble condensation product of a salt of a nitrogenous compound containing at least one hydrogen atom attached to nitrogen and selected from the class consisting of ammonia, aliphatic and aryl amines, a low molecular weight aliphatic aldehyde and a ketone containing a group selected from the class consisting of activated methyl and methylene groups.

6. A process for improving the reactivity of fibrous material which comprises treating fibrous material with a water-soluble condensation product from an ammonium salt and a low molecular weight aliphatic aldehyde and a ketone containing a group selected from the class consisting of activated methyl and methylene groups.

HANS KRZIKALLA.
RICHARD ARMBRUSTER.